Jan. 16, 1923. Re. 15,528

M. BÖHMER.
WOOL COMBING MACHINE.
ORIGINAL FILED SEPT. 19, 1922. 3 SHEETS-SHEET 1

INVENTOR.
Max Böhmer,
By his attorney,
J. H. McCready.

Jan. 16, 1923.

M. BÖHMER.
WOOL COMBING MACHINE.
ORIGINAL FILED SEPT. 19, 1922.

Re. 15,528

3 SHEETS-SHEET 2

INVENTOR.
Max Böhmer,
By his attorney,
J. H. McCready

Jan. 16, 1923.
M. BÖHMER.
WOOL COMBING MACHINE.
ORIGINAL FILED SEPT. 19, 1922.
Re. 15,528
3 SHEETS-SHEET 3
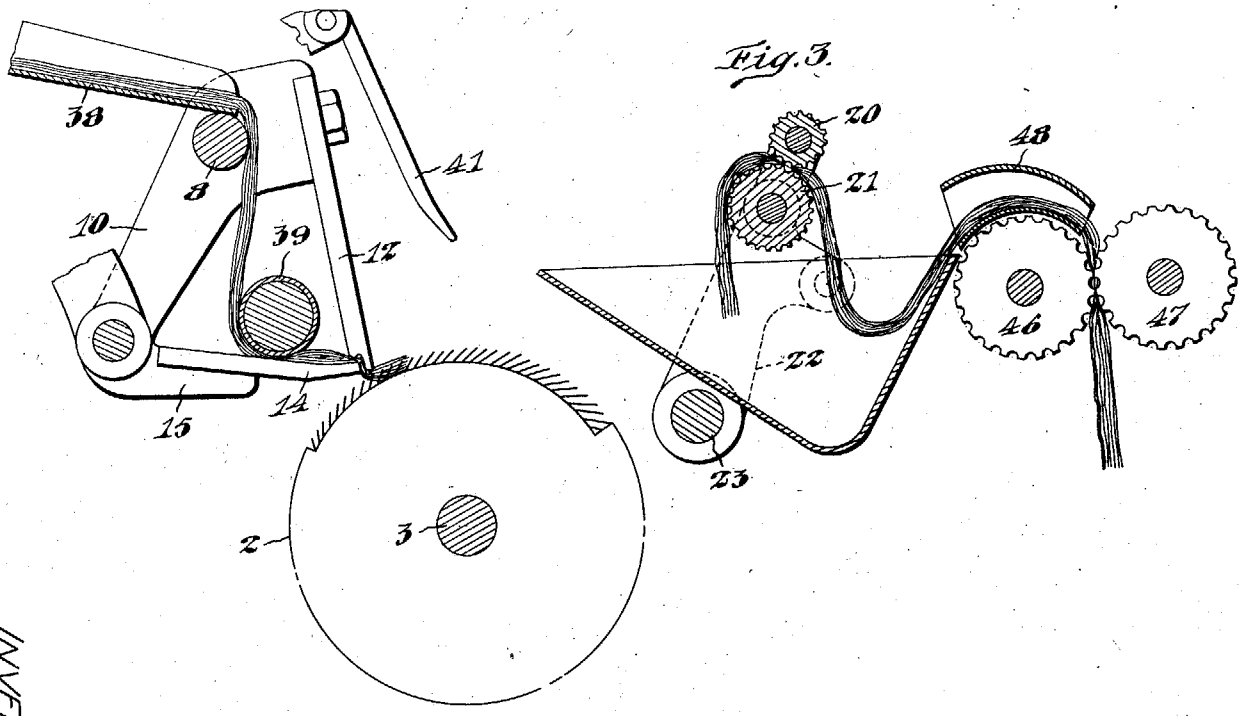
INVENTOR
Max Böhmer,
By his attorney,
J. H. McCurdy.

Reissued Jan. 16, 1923.

Re. 15,528

UNITED STATES PATENT OFFICE.

MAX BÖHMER, OF CHEMNITZ, GERMANY, ASSIGNOR TO OTTO A. BELGER, OF NEWTONVILLE, MASSACHUSETTS.

WOOL-COMBING MACHINE.

Original No. 1,429,911, dated September 19, 1922, Serial No. 575,607, filed July 17, 1922. Application for reissue filed November 21, 1922. Serial No. 602,459.

*To all whom it may concern:*

Be it known that I, MAX BÖHMER, a citizen of the Empire of Germany, residing at Chemnitz, Saxony, Germany, have invented a new and useful Improvement in Wool-Combing Machines, of which the following is a specification.

This invention relates to combing machines, and is especially concerned with machines of this type designed to handle long stapled wool or similar material.

The machines of this type in common use are open to the objection that they are relatively complicated in construction, have a comparatively small output, are very noisy in operation, and depreciate rapidly. It is the chief object of the present invention to overcome these objections. In other words, the invention aims to devise a machine of this type which will be simpler in construction than prior machines, more economical to build, will be smoother in operation, and will have an increased capacity.

The nature of the invention will be readily understood from the following description when read in connection with the accompanying drawings, and the novel features will be particularly pointed out in the appended claims.

Referring now to the drawings,

Fig. 3 is another view showing the manner in which the material is handled at one point in the cycle of the operation of the machine.

Figure 1:
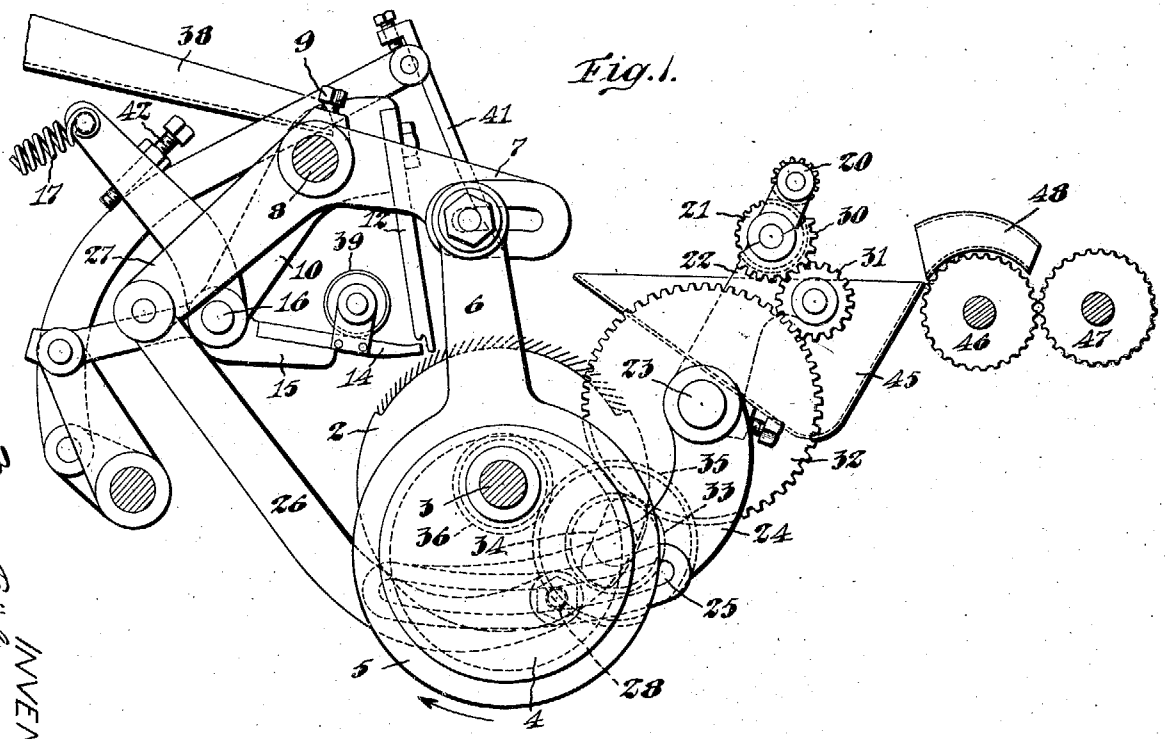
Figure 1 is a side elevation of the more important parts of a combing machine constructed in accordance with this invention.

The construction shown comprises a needle or comb segment 2 mounted on a main shaft 3 supported in suitable bearings. Keyed to this shaft is an eccentric 4 which drives an eccentric strap 5 having an arm 6 projecting upwardly therefrom. This arm has a bolt and slot connection with one arm 7 of a bell crank lever secured fast to the rock shaft 8 by means of a set screw 9. The nipper frame is mounted fast on this shaft and comprises a lever 10, to the forward end of which the upper nipper 12 is secured. The lower nipper 14 is mounted on the forward arm of a lever 15 which is fulcrumed on a stud 16 carried by the nipper lever 10, the lever 15 having a long helical spring 17 secured to its rearward end which acts normally to hold the lower nipper in contact with the upper nipper. It will be apparent that the entire nipper mechanism is swung back and forward by the eccentric 4.

The machine also includes detaching mechanism comprising fluted rolls 20 and 21 mounted on a lever or arm 22 which is secured to a rock shaft 23. Fast on this rock shaft 23 is an arm 24 having a long slot 25 therein. This arm overlaps a link 26 pivoted to the rearward arm 27 of the bell crank lever 7 previously referred to. The connection between the parts 24 and 26 includes a bolt or stud 28 which passes through the slot 25 so that the relationship between these two parts can be adjusted.

It will now be appreciated that as the eccentric 4 rotates, thus moving the arm 6 up and down and swinging the nipper frame in the manner above described, movement will also be transmitted through the parts 27, 26 and 24 to the detaching frame 22, oscillating this frame backward and forward about the axis of the shaft 23.

The detaching rolls 20 and 21 are geared together, the gear on the lower roll 21 being shown in Fig. 1 at 30. This gear meshes with another gear 31, driven by a gear 32 which rotates on the shaft 23 and is driven by a change gear 33 mounted on a shaft 34. The shaft 34 is driven by a gear 35 from another gear 36 fast on the main shaft 3. This mechanism thus permits the driving of the detaching rolls at any desired speed. It should be noted also that due to the backward and forward movement of the detaching frame or lever 22, the rolls 20 and 21 are rotated at a variable rate.

Figure 2:
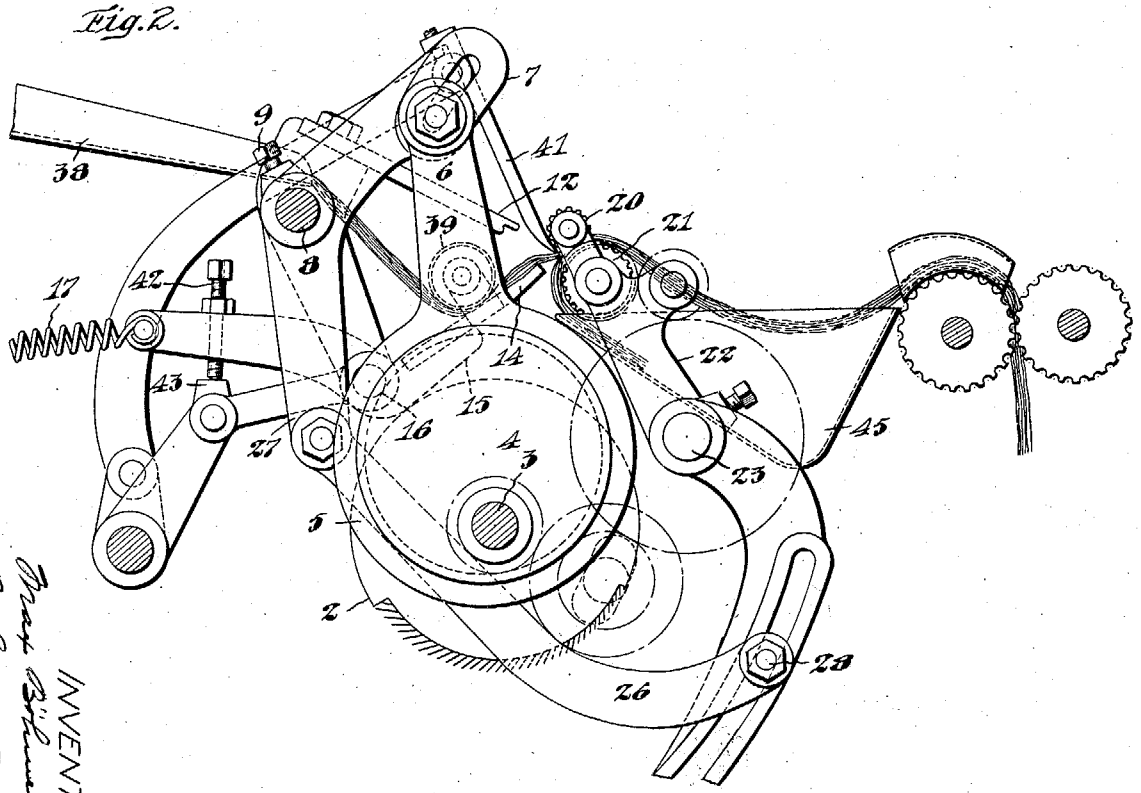
Fig. 2 is a view similar to Fig. 1 showing the parts in a different position.

The wool or other material to be combed is led through the chute 38 and under the feed roll 39 to a point between the nippers 12 and 14. During the operation of the machine the "tuft" or length of material projecting from between the nippers is combed by the teeth on the comb segment 2. As the eccentric 4 rotates in the direction indicated by the arrow, Fig. 1, and the nipper frame and the detacher frame swing toward each other, the nippers bring the combed material into delivering position, as shown in Fig. 2, where the detaching rolls 20 and 21 engage said material. Just before the nipper frame reaches the position in which it is shown in Fig. 2, the set screw 42 on the lever 15 engages a stop 43 and prevents the lower nipper 14 from following the upper nipper any further, the continued movement of the lever 7 carrying the upper nipper away from the lower nipper, and thus opening the nippers. As the rolls start to swing backwardly they draw the combed material through the nipper frame thus performing the detaching operation. During this operation they also pull the stock through the upper comb 41. This comb is moved into and out of combing position by means of connections with the shaft or stud 16 carried by the nipper lever 10.

The nipper mechanism and detaching mechanism pause for only an instant in the position shown in Fig. 2 and immediately start to swing away from each other again. The nippers again nip the stock, a new length of which has been pulled through them, and they swing slowly backward to their initial positions, as shown in Fig. 1, the new tuft of uncombed material projecting in front of the nippers being partially combed during this backward movement. This combing operation is completed before the stock is presented to the detaching rolls when the nipper frame is again swung in the opposite direction. It will be observed that the long teeth of the comb segment first engage the tuft of material to be combed and perform the primary combing operation, while the shorter teeth later engage this tuft of material and subject it to a very gentle secondary combing.

As the detaching rolls are swung toward the nipper frame the part of the web which hangs down behind the rolls is brought against the side of the web pan 45, as best shown in Fig. 2, the end of the newly delivered tuft being laid upon the upper part of this portion of the web. The overlapping effected in this manner results in producing a very uniform web of combed material. This combed web is drawn away from the detaching roll by additional rolls 46 and 47 which pull it through the funnel 48, thus forming a sliver which drops into a coiler, as usual in machines of this type.

Attention is particularly called to the fact that the swinging movement of the nipper mechanism may be adjusted through the bolt and slot connection between the eccentric and the lever 7. Likewise the swinging movement of the detaching mechanism may be adjusted independently of the movement of the nipper frame by adjusting the stud 28 in the slot 25. The speed of rotation of the nipper rolls also can be adjusted to suit existing conditions by changing the gear 33, as has been mentioned above. The fact that the swinging movement of both the nipper and detaching mechanism is produced by a single delivering member, namely, the eccentric 4, provides a very simple construction and enables the machine to operate very smoothly. This reduces the depreciation and the necessity for repairs. At the same time the nature of the driving mechanisms for the nipper and detaching frames and the detaching rolls substantially increases the output of the machine.

While I have herein shown and described the best embodiment of the invention of which I am at present aware, it will be appreciated that this embodiment may be modified in many particulars without departing from the spirit or scope of this invention.

Having thus described my invention, what I desire to claim as new is:

1. In a combing machine of the character described, the combination of combing means, a nipper mechanism movable to and fro, a detaching mechanism also movable to and fro, and a driving member having an oscillating movement and connected with both of said mechanisms to impart their to and fro movements to them.

2. In a combing machine of the character described, the combination of combing means, a nipper mechanism movable to and fro, a detaching mechanism also movable to and fro, and an eccentric driving member connected with both of said mechanisms to give them their to and fro movement.

3. In a combing machine of the character described, the combination of combing means, a nipper mechanism movable to and fro, a detaching mechanism also movable to and fro, an eccentric driving member connected with both of said mechanisms to give them their to and fro movement, and means whereby the range of movement of said mechanisms may be adjusted.

4. In a combing machine, the combination of combing means, a swinging nipper mechanism, a swinging detaching mechanism, and an eccentric connected with both of said mechanisms for imparting their swinging movements to them.

5. In a combing machine, the combination of combing means, a swinging nipper mechanism, a swinging detaching mechanism, an eccentric connected with both of said mechanisms for imparting their swinging movements to them, and means whereby the range of swinging movement of one of said mechanisms may be adjusted independently of the other.

6. In a combing machine, the combination of combing means, a swinging nipper mechanism, a swinging detaching mechanism, an eccentric connected with both of said mechanisms for imparting their swinging movements to them, and means whereby the range of movement of said detaching mechanism may be adjusted independently of the range of movement of said nipper mechanism.

7. In a combing machine, the combination of combing means, a swinging nipper mechanism, a swinging detaching mechanism, an eccentric connected with both of said mechanisms for imparting their swinging movements to them, and means whereby the range of movement of each of said mechanisms may be adjusted independently of the other.

8. In a combing machine, the combination of combing means, a swinging nipper mechanism, a swinging detaching mechanism, an eccentric connected with both of said mechanisms for imparting their swinging movements to them, said detaching mechanism comprising rolls between which combed material carried by the nipper mechanism is caught and fed, and mechanism for driving said rolls.

9. In a combing machine, the combination of combing means, a swinging nipper mechanism, a swinging detaching mechanism, an eccentric, an eccentric strap driven thereby, a connection between said eccentric strap and one of said mechanisms for transmitting an oscillating movement thereto, two arms connected with said mechanisms, and means adjustably connecting said arms together, whereby the range of movement of one of said mechanisms may be adjusted independently of the other.

MAX BÖHMER.